Figure 1:
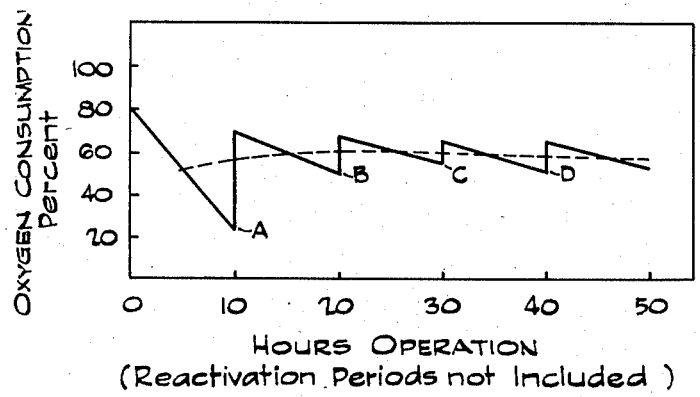

Inventors:
Kenneth D. Detling
Thurston Skei

Patented Aug. 26, 1952

2,608,585

UNITED STATES PATENT OFFICE 2,608,585

REACTIVATION OF CUPROUS OXIDE OXIDATION CATALYSTS

Kenneth D. Detling, Berkeley, and Thurston Skei, Lafayette, Calif., assignors to Shell Development Company, San Francisco, Calif., a corporation of Delaware Application June 15, 1948, Serial No. 33,096

5 Claims. (Cl. 260—597)

This invention relates to processes for the partial oxidation of organic compounds in the gaseous state in the presence of a metal oxide oxidation catalyst, and to improvements in the same. More particularly, the present invention relates to a method for maintaining and/or restoring the activity of the catalyst during the execution of such processes.

The invention is concerned with processes in which there is employed as the oxidation catalyst an oxide of a heavy metal, which metal forms stable oxides of a higher and at least one lower state of oxidation, the catalyst generally being, or essentially comprising, a lower oxide of said metal. In particular, the invention concerns a method for partial oxidation of unsaturated hydrocarbon in the gaseous state in contact with a catalyst composed of or essentially comprising cuprous oxide, to maintain the activity of the catalyst at an overall high lever under conditions which otherwise would lead to deterioration of catalyst activity. The invention includes as one of its features a method for reactivating a catalyst comprising cuprous oxide, which may have deteriorated in activity as a result of use under such conditions in the processes of the character to which the invention relates that loss in activity of the catalyst has been incurred.

The invention is limited to those processes in which a gaseous mixture comprising the unsaturated hydrocarbon that is to be partially oxidized to a desired product, and an oxygen-containing gas, e. g., air, oxygen, oxygen-enriched air, etc., is reacted in the presence of cuprous oxide under conditions which favor the desired oxidation. Such a process ordinarily will be executed with the catalyst in the form of a fixed bed, that is, immobile in bulk, positioned in a suitable reactor or reactors, and a continuous stream of the gaseous mixture will be passed into contact with the catalyst bed, the gaseous effluent from the reactor containing the desired product. In other cases, the catalyst may be in a mobile, or fluidized form in a reactor, and a portion of the catalyst may be carried along with the effluent from the reactor, to be subsequently returned. In still other cases the catalyst may be in the form of a mobile, or pseudo-liquid, or fluidized bed of finely-divided solid catalyst, but permanently held in a reaction zone. Instead of finely-divided catalysts carried along in part by the gaseous effluent from the reaction zone, there also may be used at times mobile catalyst beds from and to which catalyst is continuously withdrawn and added, respectively, by suitable mechanical means. The principles of the invention are applicable in all instances, however, certain of the advantages of the invention are particularly realized in the case of the immobile catalyst, or fixed catalyst bed type of operations, and the invention will be described with particular reference thereto.

In accordance with the present invention, the activity of the catalysts comprising cuprous oxide is maintained at a desired high level, and the activity of inactivated catalysts comprising cuprous oxide is restored, by interrupting or decreasing for brief periods of time the flow of molecular oxygen to the catalyst comprising cuprous oxide while maintaining the conditions otherwise substantially unchanged, and after each period restoring the flow of molecular oxygen to the catalyst.

The present invention is not concerned with the type of catalyst treatment known as catalyst regeneration, which treatment involves the removal, as by burning off or washing, or by decomposing with steam, of carbonaceous, tarry, or like materials deposited on the surface of a catalyst or in the pores of a catalyst. Such practices are well-known, particularly in processes such as catalytic cracking, polymerization, etc., applied to hydrocarbons or hydrocarbon mixtures. The formation of deposits on or in the cuprous oxide oxidation catalysts generally does not cause a serious problem in the processes with which the present invention is concerned because of the negligible extent to which it ordinarily occurs. However, if such deposits are formed on or in the oxidation catalysts they may be removed by known procedures as required, generally at quite infrequent intervals, independently of the practice of the method of the present invention.

The present invention is directed to a treatment designated to overcome or to prevent deterioration in catalyst activity from less tangible causes than mechanical obstruction of the catalyst by deposits thereon or therein. In the processes to which the invention relates there may be observed over prolonged periods of operation a gradual and progressive decline in the activity of the cuprous oxide catalyst for promoting the desired reaction. The decline may be qualitative—that is, the selectivity of the catalyst may be reduced, with the result that the percentage conversion of the unsaturated hydrocarbon to the desired product becomes less and the relative proportion of undesired by-products increases correspondingly—or the decline may be quantitative in the sense that the catalyst simply becomes less active for promoting oxidation reactions, with or without change in selectivity. In the latter case, the amount of the feed material that is oxidized decreases, while in the former case it is the yield of desired product based upon the amount of the feed consumed that decreases. In many cases the decrease in activity may be accompanied by little or no change in the outward appearance of the catalyst.

While it is not desired to limit the invention according to any theory, it appears possible that these changes in catalyst activity may be due, at least in part, to qualitative and/or quantitative changes in adsorption sites on the surface of the catalyst. It is generally recognized that heterogeneous catalysis by a solid catalyst is a surface phenomenon in which adsorption of reactants and reaction products at adsorptive sites on the catalyst plays an important role. A qualitative change, chemical or physical, in the character of the adsorption sites could lead to a corresponding change in the activity of the catalyst. Such changes in the adsorptive sites may occur even though the catalyst, viewed in bulk, would appear unchanged. On the other hand, a reduction in the number of active sites, as by the adsorption on the catalyst of a component normally present in the gaseous reaction mixture (for example, a product of side reaction, or an impurity in the gaseous feed) could lead to a marked decrease in the overall activity of the catalyst. Since under normal operating conditions of a continuous process, all components of the reaction mixture ordinarily are present in relatively constant amounts, each tends to be adsorbed by the catalyst until equilibrium is reached. Changes in the character of the adsorptive sites, even though slight, may result in preferential adsorption of a species not involved in the mechanism of the oxidation, with consequent "blocking" of such sites from playing a useful role on the catalyst surface.

On this basis, the present invention enables the maintenance of high overall catalyst activity throughout such a continuous gas phase oxidation process by controlling, or minimizing, or preventing or overcoming the decrease in activity of the catalyst resulting from preferential adsorption of undesired components on the catalyst. The results that have ben obtained also indicate a desirable conditioning of the catalyst may be obtained. This is indicated by a greater stability of the catalyst, that is, an increased resistance to deactivation, after a catalyst has been employed in accordance with the invention than it initially had.

The oxidation of the unsaturated hydrocarbon to produce the desired product ordinarily will be carried out at an elevated temperature. The temperature generally is within the range of from about 150° C. to about 650° C. However, higher temperatures may in some cases be employed, provided excessive thermal decomposition of the organic reactant and/or the desired product does not result. In other cases, maximum temperatures lower than 600° C. are desirable, say 450° C. as a maximum. Temperatures of about 300° C. to 500° C. frequently are employed. In the method of the present invention, in each case the temperatures that are employed are substantially those that are used in the oxidation process to which the method is applied. That is, when the so-called isothermal type of reactor is employed, no change in the temperature of the reactor is required. This is of considerable practical advantage, particularly in operations involving large size apparatus, because of the undesirability in such cases of disturbing steady temperature conditions once established. Of course, localized variations in the temperature of portions of the catalyst bed may occur, possibly because of disappearance during treatment according to the present invention, of the "hot spot" that otherwise generally exists in the catalyst bed as a result of the highly exothermic nature of the oxidation reaction. The method of the invention also is advantageous when employed in processes utilizing so-called adiabatic reactors—reactors in which means for heat removal are absent and the evolved heat goes primarily to warm the reactor feed to the maximum reaction temperature—because of the short periods of treatment that are employed. In reactors of a substantial size, that is, in reactors of a size useful for operations on a commercial, or plant scale, the heat stored in the catalyst bed and the walls, etc., of the reactor generally is sufficient to maintain adequately the temperature of the system without requiring adjustment of preheat (if any) of the feed or the provision of means to maintain the elevated temperature during the reactivation treatment.

The oxidation processes to which the method of the invention is applicable may be carried out under atmospheric pressures or at pressures above or below atmospheric pressure. Superatmospheric pressures frequently are employed, ranging up to several atmospheres pressure, however, excessively high pressures, e. g., above about 20 atmospheres, usually are avoided because it is desired to maintain the organic materials in the vapor state. No substantial change in pressure is involved in the application of the method of the present invention, and no change in the pressure is required. This characteristic makes the method of particular value in processes which involve apparatus of substantial volume and in which, accordingly, need for change of the existing pressure would be undesirable. When the change in flow rate or pressure that would result from decrease or interruption of the flow of oxygen or oxygen-containing gas is not undesirable it will not be necessary to adjust the flow rates of the other components of the feed to compensate. In other cases, the flow rates of the other components may be increased suitably to maintain the previously existing conditions of pressure, and rate of flow of gaseous mixture over the catalyst.

In accordance with the present invention, high catalyst activity at a substantially constant overall level may be maintained in gas phases oxidation processes of the hereinbefore and hereinafter described character by periodically substantially decreasing, or interrupting the flow of oxygen or oxygen-containing gas to the catalyst while, at the same time, maintaining the conditions of operation otherwise essentially unchanged. The method of the invention may be illustrated specifically by its application in the catalytic oxidation of olefins containing at least three carbon atoms in the presence of a cuprous oxide catalyst to form unsaturated carbonylic compounds of the group consisting of the unsaturated aldehydes and thhe unsaturated ketones; for example, the catalytic oxidation of propylene in the presence of cuprous oxide to form acrolein, like oxidation of isobutylene to methacrolein, the straight chain butylenes to methyl vinyl ketone, etc. Such a process is described in the copending application, Serial No. 776,616, filed September 27, 1947, now U. S. Patent No.

2,451,485. According to the process therein disclosed, a gaseous mixture comprising an olefin containing at least three carbon atoms and oxygen is passed into contact with a catalyst essentially comprising cuprous oxide, generally at a temperature within the range of about 150° C. to about 600° C., and the unsaturated carbonylic compound is recovered from the resultant gaseous mixture. The catalyst may be cuprous oxide alone, or it may be cuprous oxide supported on a carrier material, for example, pumice, silica gel, alumina, Alundum, silicon carbide porous aggregates, diatomaceous earth, etc. The oxygen may be used in the form of pure oxygen, air, or like oxygen-containing gas. The gaseous mixture may comprise, in addition to the olefin and the oxygen, an inert gas such as steam, nitrogen, carbon dioxide, etc. The following conditions are described in the aforesaid copending application as advantageous, but not limiting, for the oxidation of propylene to form acrolein:

| | |
|---|---|
| Oxygen concentration in reaction mixture prior to contact with the catalyst, volume per cent | 1 to 12 |
| Mole ratio, propylene to oxygen | 2:1 to 30:1 |
| Balance of feed | Steam and/or inert gases, such as $N_2$, $CO_2$, propane, etc. |
| Apparent contact time, seconds | 0.001 to 15 |
| Temperature, °C | 250 to 600 |
| Pressure, atmospheres | 1 to 15 |

In this particular process, it is found that only under certain operating conditions does undesirable deactivation of the catalyst occur. However, since for reasons of plant design, etc., it may be desired to operate within ranges including such conditions, the method of the present invention provides an efficient and desirable means for overcoming such deactivation.

As a specific illustration of the operation of the method of the present invention in the oxidation of propylene to acrolein, the results described in the graph presented as Figure 1 may be referred to. In the experiments described in this graph, there was employed a catalyst composed of about 1.4% cuprous oxide deposited on silicon carbide porous aggregates. Air, steam, and propylene were mixed at constant flow rates in continuous streams and the mixture passed into contact with a fixed bed of the catalyst in an elongated reaction zone surrounded by a liquid heat-transfer medium held at a desired temperature. Effluent from the reaction tube was analyzed for its acrolein content and oxygen content at suitable intervals throughout the experiment. The oxygen content was measured with the aid of an oxygen meter of the type described by Pauling et al., Journal of the American Chemical Society, 68, 795–8 (1946). The acrolein content was estimated by condensing in a water-cooled condenser the condensable products in the reactor effluent and chemically analyzing the products for acrolein content. The operating conditions used were selected so that rapid deactivation of the catalyst was obtained and, in this respect, the experiment represents a severe test of the method of the invention. Prior to the initial reactivation treatment, after ten hours operation there resulted an approximately 70% loss in the activity of the catalyst, as judged by decline in the amount of oxygen consumed and, by extrapolation, substantially complete deactivation after about 15 hours operation. In Figure 1, the abscissa represents the hours of continuous operation from the start of the experiment, the periods for the reactivation treatments described below being excluded. The ordinate represents the per cent of the oxygen contained in the feed consumed in oxidation, a convenient measure of the activity of the catalyst. As will be seen, the experiment started with a high catalyst activity, about 80% of the oxygen supplied being consumed. As shown by the curve drawn in solid line, after 10 hours operation the activity of the catalyst had declined so that only about 25% of the oxygen fed was being consumed, a level of activity below which continued operations in this experiment would not have been practicable. At this point, indicated by the letter "A" in Figure 1, the air feed was turned off for fifteen minutes and then turned on again. The other conditions were unchanged. When the flow of air was restored, the activity of the catalyst had been increased by an amount such that 70% of the oxygen fed was consumed. During the next ten hours operation, the activity of the catalyst again decreased, albeit at a slower rate. At point "B" the air supply was again turned off and the reactivation repeated as at "A." Thereafter at intervals of 10 hours, the 15 minute reactivation treatment was repeated for the duration of the experiment with the results shown by the solid line in Figure 1. Although the maximum activity of the catalyst decreased somewhat during the first portion of the experiment (as shown by the maxima in the solid line), unexpectedly the overall activity of the catalyst actually increased. This effect of the treatment is shown by the broken line in Figure 1 which is drawn through the arithmetic mean values for the activity of the catalyst in the respective "on stream" periods or cycles.

Throughout the experiment the yields of acrolein were good. The maximum observed yield of carbonylic products (90% of which was acrolein) was 81% and the minimum (except for one analysis obviously out of line) was 68% of the theoretical maximum based upon the propylene consumed.

Figure 2:
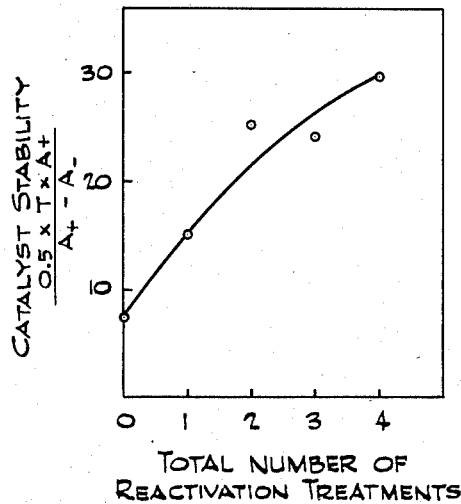

As stated previously herein, the method of the present invention not only is of value for reactivating oxidation catalysts comprising cuprous oxide, but also may serve to condition a catalyst to increase its effectiveness in the process. This unexpected effect of the present treatment is illustrated graphically in Figure 2 which presents in another form the results of the experiment on which Figure 1 is based. In this graph, the abscissa represents the number of reactivation treatments given the catalyst. The ordinate is a measure of the stability of the catalyst under the operating conditions. The values shown on the ordinate are calculated from the rates of deactivation shown in Figure 1 by the formula $$\frac{0.5 \times T \times A_+}{A_+ - A_-}$$

In this formula, T is the time in hours of the cycle (10 hours in this experiment, $A_+$ is the activity, expressed in per cent oxygen consumed, at the start of the cycle, and $A_-$ is the corresponding activity at the end of the cycle. It will be seen that the values on the ordinate represent the time in hours that would be required after each reactivation treatment for the catalyst to lose 50% of its activity in terms of the per cent oxygen consumed at the start of the cycle. As will be apparent from Figure 2, the treatment of the catalyst according to the invention led not only to the somewhat increased overall activity shown in Figure 1, but also to notably increased stability of the catalyst under the operating conditions. Whereas before the first reactivation treatment the catalyst lost 50% of its activity in slightly over 7 hours, after the fourth reactivation treatment the rate of decline in activity was such that approximately 30 hours would have been required for a corresponding loss in activity.

It will be evident, that because of such increase in the stability of the catalyst, it will not always be essential to reactivate the catalyst at regular intervals during the oxidation process. In some cases, however, it may be desired to operate with the aid of automatic equipment which shuts off, or substantially reduces, the flow of the oxygen-containing gas at regular periodic intervals. The frequency of the reactivation treatment that will be required may be determined by preliminary experiments and suitable timing thereby arranged. In some cases, it may be desirable to reactivate the catalyst as frequently as once every hour or two, while in other cases reactivation at only infrequent intervals may be required, say, after every hundred or more hours operation. The invention also includes determining the necessary frequency of reactivation by continuously or periodically estimating the activity of the catalyst, and reactivating according to the method of the invention only when necessary. Samples of the effluent from the reaction zone may be withdrawn and analyzed to determine the content of a component, such as the desired product, the oxygen, etc., and the reactivation treatment given only when it appears from such analyses to be required, or when the catalyst activity has decreased to a predetermined level. As stated previously, the method of the invention is in many instances of particular advantage when used in connection with fixed bed catalysts, especially in the isothermal type of reactor. One reason for the advantage is the relatively brief period that is required for the reactivation treatment. Ordinarily, turning off or substantially reducing the flow of oxygen to the catalyst for not over one hour is sufficient. In many cases, periods from two or three minutes to one-half hour suffice. Under otherwise similar conditions, the shorter the time between the intervals of decreased or stopped oxygen flow the shorter the interval that generally may be used. In the previously described specific instance the "on-stream" period of each cycle was ten hours and the reactivation period was fifteen minutes. In other words, only 2.5% of the total cycle time was required by the reactivation. Under conditions which would cause less rapid catalyst deactivation even a smaller proportion of the total time would be required. With isothermal reactors, which generally are very expensive, it therefore becomes a simple matter to provide an accumulator or lagging vessel in which crude product can be stored, for example, after condensation from the reactor effluent, to enable a constant supply to later stages of the process, such as product purification stages. In effect, continuous operations are obtained despite the use of only a single reactor and the discontinuous flow of oxygen to the reactor. If a plurality of reactors is employed, the method of the invention may be practiced advantageously by arranging the reactors in parallel and furnishing the feed components as through valved manifolds providing independent control of the supply of each component, or at least of the oxygen or oxygen-containing gas, to each reactor. The catalyst in any one or more reactor or reactors may be reactivated by interrupting for a brief period of time the flow of oxygen or oxygen-containing gas to that reactor without disturbing the feed supply to the other reactors. Effluent from the reactor in which the catalyst is undergoing reactivation may be combined with the feed to the other reactors. The reactivation treatment may be applied successively to the catalyst in the several reactors at intervals as required.

In the catalytic gas-phase oxidation processes with which the invention is concerned, the ratio between the material to be oxidized and the oxygen in the reactor feed often is such that an increase in the amount of oxygen would result in the formation of an explosive mixture. In other words, such processes often are operated with amounts of oxygen below the ranges of explosive mixtures. It will be apparent that in such cases the method of the invention positively avoids the danger of forming an explosive mixture in the apparatus. This is a very real advantage in large scale operations, especially in view of the fact that it is thus inherent in the method of the invention and does not require special precautions for realization.

In some cases it may be desired, after shutting off the flow of oxygen or oxygen-containing gas to the catalyst bed, to sweep the catalyst bed with an inert gas, such as steam, carbon dioxide, nitrogen, flue gas, etc., in the absence of the material undergoing oxidation, prior to restoring the flow of the reaction mixture to the catalyst. Processes of the character to which the method of the invention is applicable may be conducted with an inert diluent, or gas, in the mixture supplied to the catalyst. When desired, the inert gas may be passed over the catalyst in the absence of the oxygen and of the material that is oxidized in the process, under the conditions of pressure and temperature existing during the oxidation, and the flow of the organic reactant and the oxygen then restored.

We claim as our invention:

1. A continuous process of oxidizing an olefin containing at least three carbon atoms by reaction with molecular oxygen in the presence of a solid catalyst essentially comprising cuprous oxide to form an unsaturated carbonylic compound of the group consisting of the unsaturated aldehydes and the unsaturated ketones, comprising passing a gaseous mixture comprising one mole part of oxygen with at least two mole parts of the olefin into contact with the catalyst under predetermined conditions of temperature, pressure, and composition of the mixture, whereby the olefin is oxidized to form a gaseous product containing said carbonylic compound, separating the gaseous product from the catalyst, when the activity of the catalyst has decreased to a predetermined lower value discontinuing the flow of molecular oxygen to the catalyst for a brief interval of time while maintaining the conditions otherwise substantially unchanged, and then restoring the flow of oxygen to the catalyst.

2. In a continuous process of oxidizing propylene by reaction with molecular oxygen in the presence of a solid catalyst essentially comprising cuprous oxide to form acrolein, wherein a gaseous mixture comprising one mole part 1 of oxygen with at least two mole parts of propylene is passed into contact with the catalyst under predetermined conditions of pressure, temperature and composition of the mixture to oxidize the propylene to form a gaseous product containing acrolein, and the gaseous product separated from the catalyst, the improvement, whereby undesired reduction in the activity of the catalyst is overcome, which comprises at intervals of time decreasing for a brief period of time the flow of molecular oxygen to the catalyst while maintaining the conditions otherwise substantially unchanged, and after each period restoring the flow of molecular oxygen to the catalyst.

3. In a continuous partial oxidation process wherein a gaseous mixture comprising molecular oxygen and at least a 2:1 molar excess of of an olefin containing at least three carbon atoms is passed into contact with a fixed bed of a cuprous oxide catalyst to oxidize catalytically the olefin to an unsaturated carbonylic compound of the group consisting of the unsaturated aldehydes and the unsaturated ketones, the concentration of oxygen in said gaseous mixture being less than that in an explosive mixture with the other components of the gaseous mixture, the improvement which comprises maintaining high overall catalyst activity by periodically and successively shutting off oxygen flow, restoring oxygen flow, shutting off oxygen flow, restoring oxygen flow, while maintaining the conditions otherwise substantially unchanged, and so doing at intervals throughout the duration of the process.

4. In a continuous process of oxidizing an olefin containing at least three carbon atoms by reaction with molecular oxygen in the presence of a solid catalyst essentially comprising cuprous oxide to form an unsaturated carbonylic compound of the group consisting of the unsaturated aldehydes and ketones, which process comprises passing a gaseous mixture of steam, molecular oxygen, and at least a 2:1 molar amount with respect to the oxygen of an olefin having at least three carbon atoms into contact with the catalyst under predetermined conditions of temperature, superatmospheric pressure, and composition of the mixture, to form a gaseous product containing said carbonylic compound, and separating said product from the catalyst, the improvement, whereby undesired reduction in the activity of said catalyst is overcome, which comprises at periodic intervals decreasing for a brief period of time the flow of molecular oxygen to the catalyst while maintaining the conditions otherwise substantially unchanged, and after each period of decreased flow of oxygen to the catalyst restoring the flow of oxygen to the catalyst.

5. In the catalytic partial oxidation in the gas phase of an olefin containing at least three carbon atoms by reaction in at least a 2:1 molar excess with molecular oxygen in the presence of cuprous oxide, the improvement, whereby undesired reduction in the activity of the catalyst is overcome, which consists in periodically briefly subjecting the catalyst under substantially unchanged conditions of temperature and pressure and in the absence of oxygen, to the action of vapors of the olefin admixed with an inert gas.

KENNETH D. DETLING.
THURSTON SKEI.

REFERENCES CITED

The following references are of record in the file of this patent:

UNITED STATES PATENTS

| Number | Name | Date |
|---|---|---|
| 1,896,031 | Reynolds | Jan. 31, 1933 |
| 1,999,388 | Bader | Apr. 30, 1935 |
| 2,143,364 | Taylor | Jan. 10, 1939 |
| 2,381,677 | Matuszak | Aug. 7, 1945 |
| 2,393,532 | Hearne et al. | Jan. 22, 1946 |
| 2,451,485 | Hearne et al. | Oct. 18, 1948 |
| 2,456,597 | Schlesman | Dec. 14, 1948 |
| 2,474,334 | Shmidl | June 28, 1949 |

FOREIGN PATENTS

| Number | Country | Date |
|---|---|---|
| 390,849 | Great Britain | Apr. 5, 1933 |